(12) United States Patent
Hans et al.

(10) Patent No.: US 8,380,646 B2
(45) Date of Patent: Feb. 19, 2013

(54) METHOD FOR THE COMPUTER-ASSISTED LEARNING OF A CONTROL AND/OR A FEEDBACK CONTROL OF A TECHNICAL SYSTEM USING A MODIFIED QUALITY FUNCTION AND A COVARIANCE MATRIX

(75) Inventors: Alexander Hans, München (DE); Steffen Udluft, Eichenau (DE)

(73) Assignee: Siemens Aktiengesellschaft, München (DE)

( * ) Notice: Subject to any disclaimer, the term of this patent is extended or adjusted under 35 U.S.C. 154(b) by 358 days.

(21) Appl. No.: 12/875,159

(22) Filed: Sep. 3, 2010

(65) Prior Publication Data

US 2011/0059427 A1   Mar. 10, 2011

(30) Foreign Application Priority Data

Sep. 9, 2009   (DE) .......................... 10 2009 040 770

(51) Int. Cl.
*G06F 15/18*   (2006.01)
(52) U.S. Cl. ........................................................ 706/12
(58) Field of Classification Search .................... 706/12, 706/20, 45, 62
See application file for complete search history.

(56) References Cited

U.S. PATENT DOCUMENTS

| | | | | |
|---|---|---|---|---|
| 6,353,814 | B1* | 3/2002 | Weng | 706/12 |
| 2005/0197875 | A1* | 9/2005 | Kauffman | 705/7 |
| 2007/0198444 | A1* | 8/2007 | Movellan et al. | 706/12 |
| 2009/0098515 | A1* | 4/2009 | Das et al. | 434/107 |
| 2010/0023307 | A1* | 1/2010 | Lee et al. | 703/7 |
| 2010/0049339 | A1* | 2/2010 | Schafer et al. | 700/31 |

FOREIGN PATENT DOCUMENTS

| | | |
|---|---|---|
| DE | 4434197 A1 | 4/1995 |
| WO | 2008080864 A1 | 7/2008 |

OTHER PUBLICATIONS

Wang D. et al.: "Multi-Model Based Real-Time Final Product Quality Control Strategy for Batch Processes", Computers & Chemical Engineering, Pergamon Press, Oxford, GB, vol. 33, No. 5, May 21, 2009, pp. 992-1003.
Schneegaβ et al., "Uncertainty Propagation for Quality Assurance in Reinforcement Learning", 2008, pp. 2589-2596, Proc. of the International Joint Conference on Neural Networks (IJCNN).
Bergmeir, "Independent Component Analysis", Jul. 5, 2005, pp. 1-20, Hauptseminar Neuroinformatik Mustererkennung Jul. 7, 2005, pp. 1-2, 1-2, Senior Seminar Neuro-Informatics, Pattern Recognition.

* cited by examiner

*Primary Examiner* — David Vincent

(57) ABSTRACT

A method of computer-assisted learning of control and/or feedback control of a technical system is provided. A statistical uncertainty of training data used during learning is suitably taken into account when learning control of the technical system. The statistical uncertainty of a quality function, which models an optimal operation of the technical system, is determined by uncertainty propagation and is incorporated during learning of an action-selecting rule. The uncertainty propagation uses a covariance matrix in which non-diagonal elements are ignored. The method can be used for learning control or feedback control of any desired technical systems. In a variant, the method is used for control or feedback control of an operation of a gas turbine. In another variant, the method is used for control or feedback control of a wind power plant.

20 Claims, 2 Drawing Sheets

METHOD FOR THE COMPUTER-ASSISTED LEARNING OF A CONTROL AND/OR A FEEDBACK CONTROL OF A TECHNICAL SYSTEM USING A MODIFIED QUALITY FUNCTION AND A COVARIANCE MATRIX

CROSS REFERENCE TO RELATED APPLICATIONS

This application claims priority of German Patent Application No. 10 2009 040 770.7 DE filed Sep. 9, 2009, which is incorporated by reference herein in its entirety.

FIELD OF INVENTION

The invention relates to a method for computer-assisted learning of control and/or feedback control of a technical system and to a corresponding method for operating a technical system and to a computer program product.

BACKGROUND OF INVENTION

Various methods are known from the prior art with which, on the basis of previously determined training data representing operation of a technical system, optimal operation of this system may be modeled. The technical system is described by states, actions and follow-on states, the states being certain technical parameters or observed status variables of the technical system, and the actions representing corresponding manipulated variables, which can be varied in the technical system. Generally, reinforcement learning processes (Reinforcement Learning) are known from the prior art which, for a technical system based on training data, learn an optimal action-selecting rule according to an optimality criterion. The known methods have the drawback that they do not provide any statements with regard to the statistical uncertainty of a learned action-selecting rule. Such uncertainties are very high in the case of a small quantity of training data in particular.

Document [1] describes a method which takes account of the statistical uncertainty of a quality function used to learn an action-selecting rule. A learning method for determining an action-selecting rule is combined with a statistical uncertainty, wherein, based on uncertainty propagation known per se, which is also called Gaussian error propagation, a measure of the statistical uncertainty of a quality function taken into account during learning is determined. The uncertainty propagation takes account of correlations between uncertainties in the variables that enter into the learning method by means of a covariance matrix. The uncertainty in the variables is therefore exactly propagated and calculated, and this leads to a very high computational effort and memory space requirement in the case of computer-assisted learning of appropriate control of a technical system.

SUMMARY OF INVENTION

An object of the invention is to create a method for learning control and/or feedback control of a technical system which takes account of the statistical uncertainty of the training data used during learning and is simultaneously efficient in terms of memory space requirement and computing time.

This object is achieved by the independent claims. Developments of the invention are defined in the dependent claims.

In the inventive method control or regulation of a technical system is learned with the assistance of a computer, operation of the technical system being characterized by states which the technical system can adopt during operation, and actions which are executed during operation of the technical system and transform a respective state of the technical system into a follow-on state. In the inventive method, based on training data, comprising states, actions and follow-on states, detected during operation of the technical system, a quality function and an action-selecting rule are learned, learning taking place in particular using a reinforcement learning method. The quality function models optimal operation of the technical system with respect to criteria specific to the technical system and, during operation of the technical system, the action-selecting rule indicates the action or actions that should preferably be carried out for a respective state of the technical system.

In the inventive method a measure of the statistical uncertainty of the quality function is determined during learning of the quality function and the action-selecting rule by means of an uncertainty propagation and a modified quality function is determined as a function of the measure of the statistical uncertainty and a safety parameter which corresponds to a statistical minimum requirement of the quality function. A measure of the statistical uncertainty is in particular taken to mean a measure of the statistical variance or standard deviation, preferably the statistical variance or standard deviation itself. The action-selecting rule is learned on the basis of the modified quality function determined therefrom.

In contrast to the method in document [1] the inventive method is characterized in that the uncertainty propagation uses a covariance matrix, in which the non-diagonal elements are ignored, i.e. the non-diagonal elements are set at zero. This is equivalent to correlations between the variables taken into account during uncertainty propagation being ignored. The uncertainty is therefore no longer propagated and calculated exactly, instead only an approximation is carried out. Despite this approximation the inventive method still provides good results in the form of an action-selecting rule that is optimum in terms of safety and which maximizes the performance of the technical system by taking account of the statistical uncertainty. Compared with the method in document [1] the method has the significant advantage that the computing time and the required working memory are significantly shorter/smaller as it is now only necessary to determine the diagonal elements of the covariance matrix. In particular computing time and working memory requirement are of the same order of magnitude as conventional reinforcement learning methods that do not take account of statistical uncertainty.

In a preferred variant of the inventive method the quality function and action-selecting rule are learned by taking account of evaluations and state-action probabilities. A respective evaluation evaluates the quality of a combination of state, action executed in the state and follow-on state with respect to optimal operation of the technical system and is often also called a reward. A state-action probability indicates the probability of a follow-on state as a function of a state and the action executed in the state. If evaluations are taken into account during learning, such evaluations are included in den training data or a function exists which outputs a corresponding evaluation as a function of state, action and follow-on state.

In a particularly preferred embodiment the quality function and the action-selecting rule are learned on the basis of Bellman iteration which is known per se. A new quality function and a new measure of the statistical uncertainty of the quality function, and hereby a new modified quality function, are determined in each iteration step, the covariance matrix being determined as a function of the quality function, the state-action probabilities and the evaluations in a respective iteration step to determine the new measure of the statistical uncertainty by ignoring the non-diagonal elements. Therefore only variances enter into the uncertainty propagation. This means the covariance matrix is approximated to the extent that correlations between the statistical uncertainty of the quality function, the statistical uncertainty of the evaluations and the statistical uncertainty of the state-action probabilities are ignored.

In a particularly preferred embodiment the action-selecting rule is determined in the m-th iteration step of Bellman iteration on the basis of the following action $a_{s,max}$:

$$\forall s: a_{s,max} = \underset{a}{\mathrm{argmax}}\,[Q^m(s,a) - \xi\sigma Q^m(s,a)]$$

where $$Q^m(s,a) = \sum_{s'} P(s'\mid s,a)[R(s,a,s') + \gamma V^{m-1}(s')]$$

is the quality function and
$Q^m(s,a) - \xi\sigma Q^m(s,a)$ is the modified quality function;
$\sigma Q^m(s,a)$ is the measure ($\sigma Q$) of the statistical uncertainty of the quality function (Q) in the m-th iteration step, where $$(\sigma Q^m(s,a))^2 = \sum_{s'} (D_{QQ})^2 (\sigma V^{m-1}(s'))^2 + \\ \sum_{s'} (D_{QP})^2 (\sigma P(s'\mid s,a))^2 + \sum_{s'} (D_{QR})^2 (\sigma R(s,a,s'))^2,$$

$(D_{QQ}) = \gamma P(s'\mid s,a),$
$(D_{QP}) = R(s,a,s') + \gamma V^{m-1}(s'),$
$(D_{QR}) = P(s'\mid s,a)$ $\gamma \in [0,1]$ is a discount factor;
$\xi$ is the safety parameter;

$$V^m(s) = \underset{a}{\max}\,[Q^m(s,a) - \xi\sigma Q^m(s,a)];$$

$(\sigma V^m(s))^2 = (\sigma Q(s,a_{s,max}))^2$ applies;
$P(s'|s,a)$ is the state-action probability for the follow-on state s' when executing the action a in state s;
$R(s,a,s')$ is the evaluation of the follow-on state s' when executing the action a in state s;
$\sigma P(s'|s,a)$ is the statistical uncertainty of the state-action probabilities;
$\sigma R(s,a,s')$ is the statistical uncertainty of the evaluations.

In a further, particularly preferred embodiment of the inventive method the state-action probabilities are modeled as a state-action probability distribution and/or the evaluations are modeled as an evaluation probability distribution. The state-action probability distribution or the evaluation-probability distribution is preferably used in the above method, wherein the statistical uncertainties of the state-action probabilities or evaluations are incorporated, to determine these statistical uncertainties.

In a further variant of the inventive method the state-action probability distribution and/or the evaluation probability distribution are modeled as relative frequencies from the training data, the state-action probability distribution in particular being modeled as a multinomial distribution and/or the evaluation probability distribution in particular being modeled as a normal distribution.

In a further, particularly preferred embodiment of the inventive method the state-action probability distribution is modeled on the basis of a Bayesian estimate with an a-priori distribution and a-posteriori parameters, the a-posteriori parameters depending on the training data. This Bayesian modeling has the advantage that the uncertainties of the estimators are more easily accessible. A Dirichlet distribution is preferably used as the a-priori distribution, or optionally also a normal distribution. When using the Dirichlet distribution, the parameters thereof are selected in such a way in a particularly preferred variant that each parameter matches the quotient from the average number of follow-on states and the total number of states according to the training data. A realistic action-selecting rule is therefore learned in particular for the case of few observations as well.

The action-selecting rule learned in the inventive method can be both deterministic and stochastic. A deterministic action-selecting rule indicates a fixed action for a state of the technical system. By contrast, a stochastic action-selecting rule indicates a probability distribution for the executable actions for a state of the technical system. If a deterministic action-selecting rule π is used the action-selecting rule $\pi^m(s)$ in the m-th iteration step of the above-described Bellman iteration is preferably as follows:

$$\pi^m(s) = \underset{a}{\mathrm{argmax}}\, Q^m(s,a) - \xi\sigma Q^m(s,a),$$

where $\pi^m(s)$ is the selected action.

In a further, particularly preferred embodiment the stochastic action-selecting rule is configured in such a way that a probability distribution is determined in each iteration step of the above-described Bellman iteration as a new probability distribution for the executable actions, which probability distribution modifies the probability distribution of the last iteration step in such a way that a higher probability is allocated to the action, which maximizes the value of the modified quality function.

The inventive method can be used for any desired technical systems. In a particularly preferred variant the method is used for learning control or regulation of a turbine, in particular a gas turbine. The states of the gas turbine are, for example, the quantity of supplied fuel and/or the humming of the turbine. Actions in this connection are, for example, the change in supplied quantity of fuel or a change in the settings of the blades of the turbine.

In a further variant of the inventive method control and/or regulation of a wind power plant is learned. In this case the states of the wind power plant can be, for example, the wind strength, the rotor speed, wear of plant components and the like. Actions in this connection can be, for example, the adjustment of the setting angle of the individual rotor blades of the wind power plant.

In addition to the above-described learning method the invention also comprises a method for operating a technical system, wherein the technical system is operated on the basis of control and/or regulation which has been learned using any desired variant of the above-described learning method. The action to be executed is selected using the learned action-selecting rule in a respective state of the technical system. With a stochastic action-selecting rule this takes place for example by way of random selection of the actions according to the respective probability. In a preferred variant of this operation the above learning method is repeated at intervals, the states newly adopted by the technical system and actions carried out being taken into account as training data during each repetition.

In addition to the above-described method the invention also relates to a computer program product comprising a program code stored on a machine-readable medium for carrying out the inventive method if the program runs on a computer.

BRIEF DESCRIPTION OF THE DRAWINGS

Exemplary embodiments of the invention will be described in detail hereinafter with reference to the accompanying figures, in which.

DETAILED DESCRIPTION OF INVENTION

Figure 1:
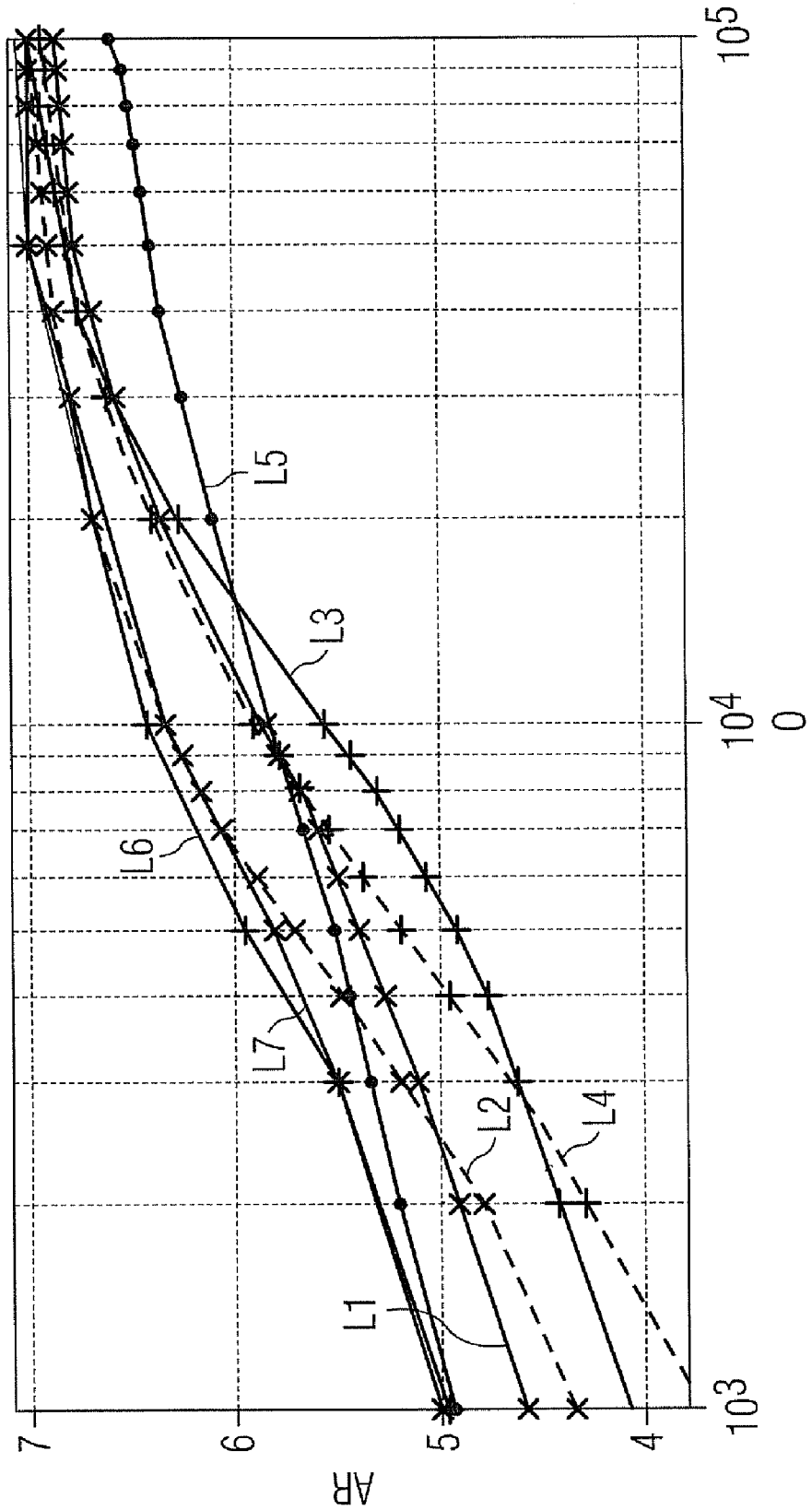
FIG. 1 shows a graph which compares the merits obtained according to the embodiments of the invention with the corresponding merits according to the method in document [1]

The invention will be described hereinafter using the example of a technical system which is characterized by a state space S and an Action space A. The state space constitutes a large number of discrete or continuous states in the form of parameters of the technical system which characterize the technical system during its operation. In the case of a gas turbine these parameters can be, for example, the quantity of supplied fuel or the humming of the turbine. The action space identifies the possible actions that may be carried out on the technical system, it being possible to change the states of the technical system using the actions. An action can be the change in a manipulated variable of the technical system, for example a change in the position of guide blades of a gas turbine, a change in the fuel supply and the like.

The dynamics of the technical system in the embodiment described here are characterized as a Markov decision process are characterized by a transitions-probability distribution $P_T:S \times A \times S \rightarrow [0,1]$ which depends on the current state of the technical system, the action carried out in the current state and the resulting follow-on state of the technical system. In the embodiment of the inventive method described here an action-selecting rule is learned on the basis of training data with the assistance of a computer, an action-selecting rule generally indicating which action should preferably be executed in a predefined state of the technical system. The action-selecting rule can be deterministic in this connection, i.e. the rule determines a certain action. However, it can also be stochastic, i.e. the action-selecting rule indicates a probability distribution of the actions to be carried out starting from a state. The aim of the inventive method is learning what is known as an action-selecting rule, which is optimal in terms of safety, which is not necessarily optimal with regard to the expected performance but satisfies a statistical minimum requirement of the action-selecting rule. Action-selecting rules can therefore be learned which do not satisfy the optimality criterion of the maximum expected performance but maximize a guaranteed performance.

The variant of the invention described here builds on the method according to document [1] with the inventive method being significantly more computationally efficient as correlations between uncertainties of variables determining the action-selecting rule are ignored, as is described in more detail further below.

A reinforcement learning method according to the prior art will firstly be described hereinafter, wherein the action-selecting rule is learned on the basis of the corresponding optimality criterion. The optimality criterion is represented by a corresponding evaluation R, the evaluation indicating for a state the action a to be carried out in this state and the follow-on state s', [and] how desirable the action a carried out is with regard to optimal operation of the technical system. Optimal operation can be determined as desired as a function of the technical system being considered. Criteria for such operation are, by way of example, that no states occur which lead to damage or destruction of the technical system, or that optimum efficiency is attained during operation of the technical system. In the case of a gas turbine, the optimal operation could, for example, be specified by the fact that a high level of efficiency is attained without the turbine humming.

According to reinforcement learning, an action-selecting rule $\pi:S \rightarrow A$ is sought which, assuming a Markov decision process $M:=(S,A,P_T,R)$ with the state space S, action space A and the probability distribution $P_T:S \times A \times S \rightarrow [0.1]$, leads to optimal operation of the technical system. In this case each state, the action executed in this state and the resulting follow-on state are evaluated using the reward function $R:S \times A \times S \rightarrow \mathfrak{R}$. Optimal operation is described by the maximum of what is known as the value function which is as follows:

$$V^\pi(s) = \sum_{s'} P(s' \mid s, a)[R(s, a, s') + \gamma V^\pi(s')]$$

This value function is the expected discounted total of future evaluations, where $\gamma \in [0,1]$ is the discount factor. As a rule what is known as the Q function $Q^\pi(s,a)$ is used which represents the expected discounted reward following selection of action a in state s and the subsequent compliance with the action-selecting rule $\pi$. The Q function for the optimal action-selecting rule $Q^{\pi*} = Q^*$ is given by a solution to what is known as the Bellman optimality equation which is as follows:

$$Q^*(s, a) = E_{s'}[R(s, a, s') + \gamma V^*(s')] = E_{s'}\left[R(s, a, s') + \gamma \max_{a'} Q^*(s', a')\right]$$

$E_{s'}$ is the expected value. Starting from $Q^*$, $\pi^*(s) = \arg\max_a Q^*(s,a)$ applies for the optimal action-selecting rule, where $\pi^*$ is a deterministic action-selecting rule. As already mentioned above, the action-selecting rule can however also be formed as a stochastic action-selecting rule $\pi(a|s)$ which provides the probability for the selection of the action a in state s.

The above Bellman optimality equation is solved by Bellman iteration, which is sufficiently known from the prior art and will be described in more detail below. In the following T is defined as the Bellman operator which is as follows for each arbitrary quality function Q:

$$(TQ)(s,a) = E_{s'}(R(s,a,s') + \gamma \max_{a'} Q(s',a'))$$

In the embodiment of the invention described below the statistical uncertainty is also considered, and this results from the uncertainties in the measurements in the technical system which are used as training data to determine an action-selecting rule for the technical system.

These statistical uncertainties lead to an uncertainty in the Q function being considered and therefore in the learned action-selecting rule. The uncertainty that exists in reinforcement learning results from ignorance of the true behavior of the technical system, i.e. the true Markov decision process which fowls the basis of the technical system. The more observations that exist about the technical system in the form of training data, the more information there is about the Markov decision process. The higher the stochasticity, the more uncertainty remains in relation to the Markov decision process for a predefined number of observations.

The uncertainty in the measurements based on training data, i.e. the uncertainty of the transitions from one state to the next by applying an action and the evaluation associated therewith, will be propagated in the variant of the invention described below in the Q function, and, more precisely, by uncertainty propagation. The principle of uncertainty propagation, also called Gaussian propagation of uncertainties or Gaussian error propagation, is sufficiently known from the prior art and is based on a Taylor development of the first order by the respective estimated point. According to the method described in document [1] the uncertainty of the function values $f(x)$, where $f:\Re^m \to \Re^n$ and with predefined uncertainty of the arguments x, is calculated on the basis of the following covariance calculated:

$$\mathrm{Cov}(f)=\mathrm{Cov}(f,f)=D\mathrm{Cov}(x)D^T$$

In this case $$D_{i,j} = \frac{\partial f_i}{\partial x_j}$$

denotes the Jacobi matrix of f according to its arguments x. $\mathrm{Cov}(x)=\mathrm{Cov}(x,x)$ denotes the covariance of the arguments x which in turn depends on the uncertainty of x. The function f then has the symmetrical and positively definite covariance and uncertainty $\mathrm{Cov}(f)$. The method in document [1] has the drawback that the complete covariance matrix is calculated which in the m-th Bellman iteration step depends on the Q function $Q^m$ in this iteration step, the transition probability P and the evaluation R. This complete calculation of the covariance matrix in each iteration step is laborious and leads to a very high computing time.

According to the invention it has been found that the method in document [1] can be configured so as to be significantly more computationally efficient by ignoring the non-diagonal elements of the covariance matrix, i.e. setting them to zero. This tallies with the assumption that correlations between the uncertainties of variables determining the covariance matrix, i.e. correlations between the Q function $Q^m$, the transition probability P and the evaluation R, can be ignored. Despite this approximation very good action-selecting rules can still be learned in this way, as the inventors were able to prove using experiments. The advantage of the inventive method lies in the fact that its computing time is many times shorter than in the method of document [1]. The implementation of the inventive method will be described in detail hereinafter using an exemplary embodiment.

Analogous to the method in document [1] the uncertainty propagation or Gaussian error propagation is used to propagate the uncertainties of the measurements, i.e. the transition probabilities and the evaluations, into the Q function and therewith into the action-selecting rule. The uncertainty of function values $f(x)$, where $f:\mathrm{R}^m \to \mathrm{R}^n$, can be described as variance as follows on the basis of the approximation that the covariance matrix contains only diagonal elements:

$$(\sigma f)^2 = \sum_i \left(\frac{\partial f}{\partial x_i}\right)^2 (\sigma x_i)^2$$

This approximative consideration of the uncertainty, while ignoring correlations between variables, leads in the m-th iteration step of Bellman iteration, which is given by:

$$Q^m(s, a) = \sum_{s'} P(s' \mid s, a)[R(s, a, s') + \gamma V^{m-1}(s')],$$

to the following uncertainty in the Q function:

$$(\sigma Q^m(s, a))^2 = \sum_{s'} (D_{QQ})^2 (\sigma V^{m-1}(s'))^2 + $$
$$\sum_{s'} (D_{QP})^2 (\sigma P(s' \mid s, a))^2 + \sum_{s'} (D_{QR})^2 (\sigma R(s, a, s'))^2,$$

$$(D_{QQ}) = \gamma P(s' \mid s, a),$$

$$(D_{QP}) = R(s, a, s') + \gamma V^{m-1}(s'),$$

$$(D_{QR}) = P(s' \mid s, a)$$

In the above equations the general case of a stochastic action-selecting rule $\pi$ is assumed, $\pi(a|s)$ providing the probability of the selection of action a in state s. This notation can also be used to describe a deterministic action-selecting rule $\pi_d$, where $\pi(a|s):=1$ applies in such a case, if $\pi_d(s)=a$, and $\pi(a|s):=0$, if $\pi_d(s)\neq a$. To assess or evaluate a given action-selecting rule the above variables $V^m(s)$ and $(\sigma V^m(s))^2$ are as follows for a stochastic action-selecting rule $\pi$:

$$V^m(s) = \sum_a \pi(a \mid s) Q^m(s, a),$$

$$(\sigma V^m(s))^2 = \sum_a \pi(a \mid s)(\sigma Q^m(s, a))^2.$$

In contrast the variables for a deterministic action-selecting rule are as follows:

$$V^m(s) = Q^m(\pi(s), a),$$

$$(\sigma V^m(s))^2 = (\sigma Q^m(\pi(s), a))^2$$

With iterative calculation of the action-selecting rule according to the above Bellman optimality equation, V or σV are as follows for the Q function Q* of the optimal action-selecting rule in the m-th iteration step of Bellman iteration:

$$V^m(s) = \max_a Q(s, a)$$

$$(\sigma V^m(s))^2 = \left(\sigma Q\left(s, \mathrm{argmax}_a Q(s, a)\right)\right)^2$$

According to the invention the above-described uncertainty propagation is used simultaneously with Bellman iteration, so $Q^m$ and $\sigma Q^m$ are updated in each iteration step.

Appropriate estimators are used for the transition probability P and the evaluation R with their uncertainties σP or σR, as will be described in more detail below. Initially, in the case of iteration with the Q function $Q^0$, a corresponding uncertainty $\sigma Q^0$ is begun with, where, for example, $Q^0:=0$, $\sigma Q^0:=0$ can apply.

A fixed value of $Q^*$ with corresponding uncertainty $\sigma Q^*$ is achieved if the above-described iteration converges. This information can be used to hereby obtain the following Q function which takes account of a statistical uncertainty:

$$Q_u^*(s,a) = Q^*(s,a) - \xi \sigma Q^*(s,a)$$

This Q function which takes account of uncertainty provides the expected performance with a guaranteed probability of $P(\xi)$, and, more precisely, under the condition that the action a is executed in state s and then the action-selecting rule $\pi^*(s) = \arg\max_a Q^*(s,a)$ is followed. It should be noted in this regard that an action-selecting rule based on $Q_u^*$, i.e. $\pi_u(s) = \arg\max_a Q_u^*(s,a)$, does not generally improve the guaranteed performance as $Q_u^*$ only considers the uncertainty in one iteration step. Generally $Q_u^*$ does not represent the Q function of the action-selecting rule $\pi_u$, and this leads to an inconsistency. To use knowledge about the uncertainty to maximize the guaranteed performance, the uncertainty has to be considered in each iteration step of Bellman iteration when updating the action-selecting rule.

In the embodiment of the invention described here the optimal action-selecting rule is therefore not calculated on the basis of $Q^m(s,a)$ in the m-th Bellman iteration step, but based on the modified Q function $Q^m(s,a) - \xi \sigma Q^m(s,a)$. This means that in the embodiment of the invention described here the action-selecting rule is calculated on the basis of the following equation:

$$\forall s : a_{s,max} = \underset{a}{\arg\max} Q^m(s,a) - \xi \sigma Q^m(s,a)$$

$a_{s,max}$, instead of $\arg\max_a Q(s,a)$, is therefore used in the following iteration steps to determine suitable values for $Q^{m-1}$ and $\sigma Q^{m-1}$.

An action-selecting rule is therefore obtained which is optimal in relation to a confidence value dependent on the parameter $\xi$, i.e. an action-selecting rule is obtained whose minimal performance is guaranteed as a function of a predefined probability. By maximizing the guaranteed performance $Z(s,a)$, an action-selecting rule $\pi$ is therefore formally obtained in such a way that the following applies:

$$\forall s,a : P(\overline{Q}^\pi > Z(s,a)) > P(\xi)$$

In this case $\overline{Q}^\pi$ denotes the true Q function of $\pi$ and $P(\xi)$ is a previously specified and fixed probability. The performance Z is therefore approximated by $Q_u^\pi$ and the following equation is solved:

$$\pi^\xi(s) = \underset{\pi}{\arg\max}\underset{a}{\max} Q_u^\pi(s,a) = \underset{\pi}{\arg\max}\underset{a}{\max} Q^\pi(s,a) - \xi \sigma Q^\pi(s,a),$$

and, more precisely, under the condition that $Q^\pi$ is a valid Q function of $\pi$.

In the case of a deterministic action-selecting rule, the following action-selecting rule which is optimal in terms of safety is obtained in this way within the framework of Bellman iteration:

$$\pi^m(s) = \underset{a}{\arg\max} Q^m(s,a) - \xi \sigma Q^m(s,a)$$

This action-selecting rule does not form the optimal action in relation to the maximum of the Q values of a certain state in each iteration step, but in relation to the maximum of the Q values minus their weighted uncertainty, the weighting being suitably deter mined on the basis of parameter $\xi$.

It cannot be guaranteed that the just-mentioned deterministic action-selecting rule based on Bellman iteration will converge. In particular there are two effects which lead to oscillation of the action-selecting rule and therefore to non-convergence of the corresponding Q function. The first effect has already been described in document [1] and is based on a bias toward $\xi \sigma Q(s,\pi(s))$, which is greater than $\xi \sigma Q(s,a), a \neq \pi(s)$ if $\pi$ is the examined action-selecting rule is and $\xi > 0$ applies. This is due to the fact that $R(s,\pi(s),s')$ and $V(s') = Q(s'\pi(s))$ are more strongly correlated than $R(s,a,s')$, $a \neq \pi(s)$ and $V(s')$ as the value function implies the selection of the action $\pi(s)$ for each subsequent occurrence of state s. A change in the action-selecting rule from $\pi$ to $\pi'$ in a certain state s, owing to the condition $Q(s,\pi(s)) - \xi \sigma Q(s,\pi(s)) < Q(s,\pi'(s)) - \xi \sigma Q(s,\pi'(s))$, can lead to a greater uncertainty of $Q(s,\pi'(s))$ and can therefore jump back again in the next iteration step.

As already mentioned, there is also a second effect which can cause oscillation if there is a specific constellation of Q values and corresponding uncertainties in actions that occur. An example of such a constellation are the two actions $a_1$ and $a_2$ in a state s with similar Q values, but different uncertainties, where $a_1$ has a greater uncertainty, but is the better action for the real Markov-decision process. In the updating step the action-selecting rule $\pi^m$ which takes account of the uncertainty could now cause the action $a_2$ to be selected, which is the action with the smaller uncertainty. However, the fact that this action is rated lower can sometimes occur in the next iteration step if the value function is updated for the changed action-selecting rule $\pi^m$ (which selects action $a_2$). Consequently, when updating the action-selecting rule, the action-selecting rule can be changed in the next step in such a way that in state s action $a_1$ is selected as the Q function then reflects the fact that action $a_2$ is worse than action $a_1$. Following the next updating of the Q function the values for the two actions are then similar as the value function implies the selection of $a_1$ and the poor effect of $a_2$ influences the function $Q(s,a_2)$ only once. There is therefore an oscillation between actions $a_1$ and $a_2$. It should be noted in this connection that in the method of document [1] both of the above-described effects occur, whereas in the inventive method only the second effect is relevant. This is due to the fact that covariances between the Q function and the reward are not considered.

To solve the above-described problem of non-convergence a stochastic action-selecting rule with a suitable updating step based on the above action $a_{s,max}$ is determined in a particularly preferred embodiment. It is intuitively grasped in this connection that for $\xi > 0$ the action-selecting rule which is optimal in terms of safety should be stochastic as the aim is to minimize the risk of a small future reward.

In the variant of the invention described here a stochastic action-selecting rule is used which is initialized with equally probable actions. The probability of the best action according to $Q_u^\pi$ is then increased in each iteration step, while the probability of all other actions is lowered, and, more precisely, on the basis of the following equation:

$$\forall s, a: \pi^m(a \mid s) =$$

$$\begin{cases} \min(\pi^{m-1}(a \mid s) + 1/t, 1), \text{ falls } a = a_{Q_u}(s) \\ \dfrac{\max(1 - \pi^{m-1}(s, a_{Q_u}(s)) - 1/t, 0)}{1 - \pi^{m-1}(s, a_{Q_u}(s))} \pi^{m-1}(a \mid s), \text{ otherwise} \end{cases}$$

Here $a_{Q_u}(s)$ denotes the best action according to $Q_u$, i.e. the following applies:

$$a_{Q_u}(s) = \mathrm{argmax}_a Q(s,a) - \xi \sigma Q(s,a)$$

The convergence and attainability of all possible action-selecting rules is ensured owing to the harmonically decreasing rate of change. In addition to the guarantee of convergence the experiments carried out by the inventors also show that the stochastic action-selecting rule provides better results than a deterministic action-selecting rule.

The time complexity of the conventional Bellman iteration is $O(|S|^2|A|)$. The inventive method adds the step of updating the uncertainty $\sigma Q$ to the Q function which also has a time complexity of $O(|S|^2|A|)$. The method as a whole therefore has a time complexity of $O(|S|^2|A|)$. The method according to document [1], which calculates the complete covariance matrix, adds a time complexity between $O((|S||A|)^2 \log(|S||A|))$ and $O((|S||A|)^{2.376})$ when updating the covariance matrix, so it has a higher time complexity than conventional Bellman iteration. The memory space complexity of standard Bellman iteration is determined by the transition probabilities P and the estimated evaluations R, which each require a memory space of $O(|S|^2|A|)$. The Q function requires a memory space of $O(|S||A|)$. The total memory space complexity of standard Bellman iteration is therefore $O(|S|^2|A|)$. A complexity of $O(|S|^2|A|)$ for $\sigma P$ and $\sigma R$ and of $O(|S||A|)$ for $\sigma Q$ is added by implementing the uncertainty. The total memory space complexity therefore remains at $O(|S|^2|A|)$. In contrast to this the method according to document [1] requires memory space for the complete covariance matrix, which consists of the part-matrices Cov(Q), Cov(Q,P), Cov(Q,R), Cov(P), Cov(P,R) and Cov(R). This leads to a memory space complexity of $O(|S|^5|A|^3)$. It can therefore clearly be seen that both the time complexity and the memory space complexity are significantly lower in the method described here than in the method of document [1].

As already described above, the calculations for determining the action-selecting rule, which is optimal in terms of safety, are based on the estimates, based on training data, for the transition probabilities P and evaluations R. By way of example, a frequentistic estimate for P and R can be used here, employing the relative frequency of the states that occur on the basis of the training data. In this case the transition probability is modeled as a multinominal distribution and the uncertainty calculated on the basis of this as follows:

$$(\sigma P(s' \mid s, a))^2 = \frac{P(s' \mid s, a)(1 - P(s' \mid s, a))}{n_{sa} - 1}$$

Here $P(s'|s,a)$ corresponds to the relative frequency of follow-on state s' given the state s and action a. Furthermore, $n_{sa}$ denotes the number of observed transitions in a follow-on state starting from the state action pair (s, a). All of this information originates from the training data.

The evaluations can be modeled in a similar manner on the assumption of normal distribution, the mean of all observed evaluations of a transition (s, a, s') being used as the expected value for the evaluation. The uncertainties for the evaluations therefore result as follows:

$$(\sigma R(s, a, s'))^2 = \frac{\mathrm{var}(R(s, a, s'))}{n_{sas'} - 1}$$

Here the expression in the numerator corresponds to the variance in a normal distribution modeled on the basis of the training data. Furthermore, $n_{sas'}$ is the number of observed transitions (s, a, s').

Although the above-described estimate of the transition probabilities based on relative frequencies conventionally leads to good results, the corresponding uncertainty estimate is problematic if it provides only a few observations as training data. If, for example, a special transition is observed twice in two experiments (i.e., if $n_{sas'} = n_{sa} = 2$ applies), $\sigma P(s'|s,a) = 0$ results for its uncertainty. This leads to the uncertainties often being inadequately rated in the case of few observations.

A Bayesian estimate, instead of the frequentistic approach, may also be used to determine the transition probabilities. In this case Dirichlet distribution with the following density is used as a-priori distribution over the parameter space $P(s_k|s_i, a_j)$ for a state $s_i$, an action $a_j$ and a follow-on state $s_k$:

$$Pr(P(s_1, \mid s_i, a_j), \ldots, P(s_{|S|} \mid s_i, a_j))_{a_{ij1}, \ldots, a_{ij|S|}} = \frac{\Gamma(\alpha_{ij})}{\prod_{k=1}^{|S|} \Gamma(\alpha_{ijk})} \prod_{k=1}^{|S|} P(s_k \mid s_i, a_j)^{\alpha_{ijk} - 1},$$

where $\alpha_{ij} = \Sigma_{k=1}^{|S|} \alpha_{ijk}$ applies. Dirichlet distribution is what is known as the "conjugate prior" with the following a-posteriori-parameters:

$$\alpha_{ijk}{}^d = \alpha_{ijk} + n_{s_i a_j s_k}, \alpha_{ij}{}^d = \Sigma_{k=1}^{|S|} \alpha_{ijk}{}^d.$$

Here $n_{s_i a_j s_k}$ is the number of transitions from $S_i$ to $s_k$ when carrying out action $a_j$ according to the training data. By using the expected value of a-posteriori distribution as the estimator, i.e. by estimating the probability as $P(s_k|s_i, a_j) = \alpha_{ijk}{}^d / \alpha_{ij}{}^d$, the following results as the uncertainty for P:

$$\sigma P(s_k \mid s_i, s_j) = \frac{\alpha_{ijk}^d(\alpha_{ij}^d - \alpha_{ijk}^d)}{(\alpha_{ij}^d)^2(\alpha_{ij}^d + 1)}$$

$\alpha_{ijk}$ constitute the parameters of Dirichlet distribution. The same estimates and slightly lower uncertainties compared to the above-described frequentistic modeling of the transition probabilities are obtained by the selection of $\alpha_{ijk} = 0$. On the other hand, the selection of $a_{ijk} = 1$ leads to a distribution in which all transitions from one state to all other states are equally probable.

The selection of $\alpha_{ijk} = 0$ and $\alpha_{ijk} = 1$ represent extremes in each case, which are not suitable for most applications. In a particularly preferred variant of the invention the parameters of Dirichlet distribution are therefore determined as follows:

$$\alpha_{ijk} = \frac{m}{|S|}$$

Here m is the average number of expected follow-on states of all state action pairs and $|S|$ is the total number of states. This preferred selection of $\alpha_{ijk}$ makes it possible to approximate an a-priori probability with maximal entropy over a subset of the state space with a quantity of m states. The highest proportion of probability in the subset of m states which were actually observed is therefore distributed, and the probability of all other (non-observed) follow-on states is very small. Compared with a-priori distribution with $\alpha_{ijk}=1$ only a few observations are required for the actually observed follow-on states in order to achieve a higher probability for observed follow-on states than for non-observed follow-on states. At the same time the estimate of the uncertainty is less extreme than in the case of the frequentistic approach as the fact that the same observation was made twice does not lead to the uncertainty becoming zero.

Embodiments of the inventive method were tested using what is known as the "Wet Chicken" benchmark problem. In the original wet chicken problem a canoeist was observed who paddled along a one-dimensional river of length l and a flow speed v=1. At position x=1 of the river there was a waterfall. Starting from position x=0 the canoeist attempted to come as close as possible to the waterfall without falling into it. If he fell into the waterfall he would have to start at position x=0 again. The reward or evaluation increased linearly with proximity to the waterfall and was given by r=x. The canoeist had the option of drifting, of maintaining his position or of paddling back. Turbulences in the river with a magnitude of s=2.5 caused stochastic transitions in state. Following execution of an action by the canoeist in his actual position (while taking account of the flow of the river as well), his new position was given by x'=x+n, where n∈[−s,s] is an equally distributed random value. The two-dimensional wet chicken problem considered here is expanded by a width w. Consequently two additional actions are possible for the canoeist. On the one hand he can move the canoe to the right and, on the other hand, to the left by a unit. The position of the canoeist is denoted as (x,y) and the start position as (0,0). The flow speed v and the amount of turbulence s depends on y and v=3y/w and s=3.5−v apply. A discrete problem was considered in the experiment, i.e. the values of x and y were always rounded up to the next whole value. While the flow speed of the river is zero at the left bank, the amount of turbulence is maximal. On the other hand, there is no turbulence at the right bank but the flow speed is too high to paddle back.

Corresponding action-selecting rules were learned using the inventive method based on the above-described problem. One hundred possible states on the river were considered in the experiments shown in FIGS. 1 and 2, i.e. the canoeist can adopt 10×10 possible positions on the river. In other experiments 5×5 or 20×20 states were considered. A fixed number of observations was generated by means of a random exploration of the state space. The generated observations were used as input variables (i.e. training data) for the inventive determination of the action-selecting rule which is optimal in terms of safety. The discount factor γ was set to 0.95. After an action-selecting rule had been determined it was tested over 100 episodes with 1,000 steps each.

FIG. 1 shows the results of the tested action-selecting rules, averaged over 100 passes. FIG. 1 reproduces the average reward of the action-selecting rules as a function of the number of observations used for learning the action-selecting rule. The observations are plotted along the abscissa and identified by an O, whereas the average reward is reproduced along the ordinate as AR. Line L1 shows the result for the safety parameter $\xi=0.5$ for the frequentistic approach to estimating the transition probabilities, line L2 the result for $\xi=0.5$ for the Bayesian approach, line L3 the result for $\xi=1$ for the frequentistic approach and line L4 the result for $\xi=1$ for the Bayesian approach. The result of learning an action-selecting rule without considering an uncertainty (i.e. where $\xi=0$) is reproduced as line L5 by way of comparison. Learning an action-selecting rule on the basis of the complete covariance matrix according to document [1] is also shown. Line L6 shows the learned action-selecting rule according to the method in document [1] for $\xi=1$ and line L7 the action-selecting rule learned using the method according to document [1] for $\xi=0.5$. For reasons of simplicity only stochastic action-selecting rules, with the exception of $\xi=0$, were considered. It can be seen from FIG. 1 in particular that the performance of the method of document [1] is higher but that good results are also achieved for the inventive method, and this is reflected in high average rewards—in particular in the case of a higher number of observations. Furthermore, the methods, which take account of statistical uncertainties, are also better with a higher number of observations than the method which does not take account of uncertainties in the action-selecting rule.

Figure 2:
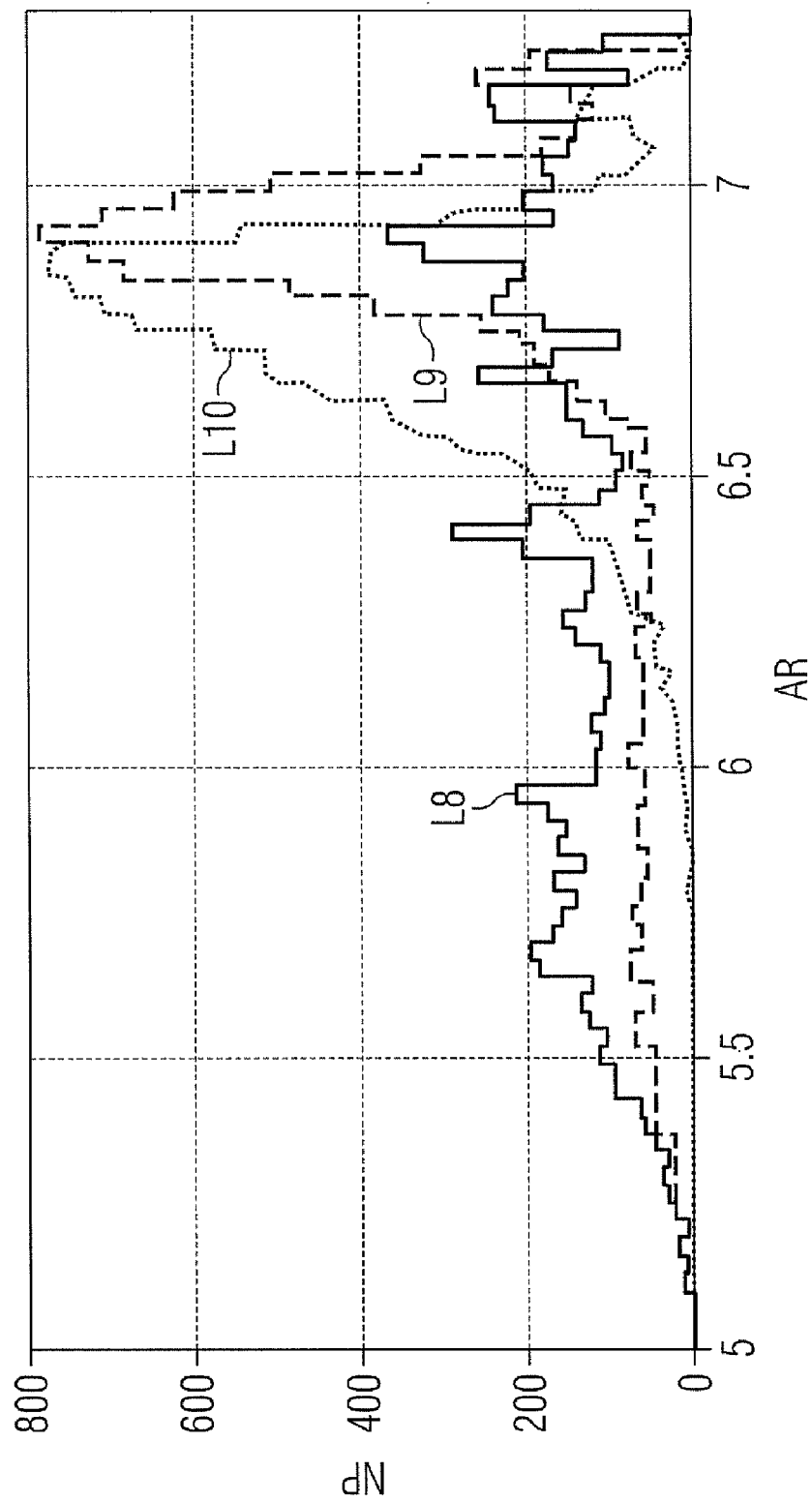
FIG. 2 shows a graph which compares the merits obtained with embodiments of the inventive method with merits which are obtained with a method that does not take account of any statistical uncertainty of the quality function.

FIG. 2 shows histograms of the frequency of action-selecting rules as a function of the average rewards for 1,000 learned action-selecting rules. The average rewards AR are reproduced along the abscissa and the number NP of learned action-selecting rules with the corresponding average rewards along the ordinate. The histogram with the solid line L8 relates to a learned action-selecting rule with $\xi=0$ (i.e. without considering uncertainties), the histogram with the broken line L9 relates to an action-selecting rule learned using the inventive method with $\xi=1$ and the histogram with the dotted line L10 to an action-selecting rule learned using the inventive method with $\xi=2$. $4\times10^4$ observations were used to generate each action-selecting rule. It can be seen from FIG. 2 that action-selecting rules learned using the inventive method have a clear maximum of the frequencies in the region of a large average reward. This maximum is lower in the action-selecting rule when uncertainty is not considered. By contrast, action-selecting rules generated using the inventive method, with low average rewards have a lower frequency compared with corresponding action-selecting rules where uncertainty is not considered. Therefore, by considering uncertainty the amount of action-selecting rules with lower reward is reduced and the expected performance increased.

A fundamental advantage of the inventive method compared with the method in document [1] lies in the much shorter computing time. For the wet chicken problem with 5×5 states, a computing time of 5.61 s resulted for the method in document [1] to generate the selection rule, whereas the inventive method needed only 0.0002 s. In the case of the wet chicken problem with 10×10 states, the computing time of the method in document [1] was $1.1\times10^3$ s, whereas the inventive method needed only 0.034 s. No action-selecting rule at all could be determined using the method in document [1] for the wet chicken problem with 20×20 states owing to the long computing time and great memory space requirements resulting therefrom, whereas the inventive method required 1.61 s to generate the action-selecting rule.

The above-described wet chicken experiment is used solely to clarify the better performance of the inventive method compared with known methods. According to the invention the method is used for control or regulation of technical systems. A simulation was also carried out to control a gas turbine in order to test the inventive method. The inventive method demonstrated good performance with low computing time for this simulation as well.

Bibliography

[1] D. Schneegaβ, S. Udluft, T. Martinetz: Uncertainty Propagation for Quality Assurance in Reinforcement Learning, 2008, Proc. of the International Joint Conference on Neural Networks (IJCNN), pages 2589-2596.

The invention claimed is:

1. A method of computer-assisted learning of control and/or feedback control of a technical system, wherein an operation of the technical system is based upon
    states, the technical system adopting the states during the operation, and
    actions which are executed during the operation of the technical system and transform a state of the technical system into a subsequent state, comprising:
    learning a quality function and an action-selecting rule based upon training data comprising states, actions and subsequent states detected during the operation of the technical system;
    modeling an optimal operation of the technical system by the quality function;
    indicating an action that should preferably be carried out for a state of the technical system by the action-selecting rule during the operation of the technical system;
    determining a measure of a statistical uncertainty of the quality function by an uncertainty propagation during the learning of the quality function and the action-selecting rule;
    determining a modified quality function as a function of the measure of the statistical uncertainty and a safety parameter corresponding to a statistical minimum requirement of the quality function, the uncertainty propagation using a covariance matrix in which non-diagonal elements are ignored; and
    learning the action-selecting rule based upon the modified quality function.

2. The method as claimed in claim 1, wherein
    the quality function is learned by taking account of evaluations and state-action probabilities,
    an evaluation evaluates a quality of a combination of state, action executed in the state, and subsequent state with respect to the optimal operation of the technical system, and
    a respective state-action probability indicates a probability of a subsequent state based upon a function of a state and action executed in the state.

3. The method as claimed in claim 2, wherein
    the quality function and the action-selecting rule are learned based upon a Bellman iteration,
    a new quality function and a new measure of the statistical uncertainty of the quality function and thereby a new modified quality function is determined in each iteration step of the Bellman iteration,
    the covariance matrix is determined in a iteration step as a function of the quality function, the state-action probabilities and the evaluations while ignoring the non-diagonal elements.

4. The method as claimed in claim 3, wherein in a m-th iteration step of the Bellman iteration the action-selecting rule is determined based upon the following action $a_{s,max}$:

$$\forall s : a_{s,max} = \operatorname*{argmax}_{a}[Q^m(s, a) - \xi\sigma Q^m(s, a)],$$

wherein $$Q^m(s, a) = \sum_{s'} P(s' \mid s, a)[R(s, a, s') + \gamma V^{m-1}(s')]$$

is the quality function and
$Q^m(s,a)-\xi\sigma Q^m(s,a)$ is the modified quality function;
$\sigma Q^m(s,a)$ is the measure of the statistical uncertainty of the quality function in the m-th iteration step, wherein $$(\sigma Q^m(s, a))^2 = \sum_{s'} (D_{QQ})^2 (\sigma V^{m-1}(s'))^2 +$$
$$\sum_{s'} (D_{QP})^2 (\sigma P(s' \mid s, a))^2 + \sum_{s'} (D_{QR})^2 (\sigma R(s, a, s'))^2,$$

$(D_{QQ}) = \gamma P(s' \mid s, a),$ $(D_{QP}) = R(s, a, s') + \gamma V^{m-1}(s'),$ $(D_{QR}) = P(s' \mid s, a)$ $\gamma \in [0,1]$ is a discount factor;
$\xi$ is the safety parameter;

$$V^m(s) = \max_{a}[Q^m(s, a) - \xi\sigma Q^m(s, a)];$$

$(\sigma V^m(s))^2 = (\sigma Q(s, a_{s,max}))^2$ applies;
P(s'|s,a) is the state-action probability for the follow-on state s' when executing the action a in state s;
R(s,a,s') is the evaluation of the follow-on state s' when executing the action a in state s;
σP(s'|s,a) is the statistical uncertainty of the state-action probabilities;
σR(s,a,s') is the statistical uncertainty of the evaluations.

5. The method as claimed in claim 2, wherein state-action probabilities are modeled as a state-action probability distribution or evaluations are modeled as an evaluation probability distribution.

6. The method as claimed in claim 2, wherein state-action probabilities are modeled as a state-action probability distribution and evaluations are modeled as an evaluation probability distribution.

7. The method as claimed in claim 4, wherein the statistical uncertainty of the state-action probabilities are determined from the modeled state-action probability distribution and the statistical uncertainty of the evaluations are determined from the modeled evaluation probability distribution.

8. The method as claimed in claim 5, wherein the state-action probability distribution or the evaluation probability distribution is modeled as relative frequencies from the training data, the state-action probability distribution being modeled in particular as a multinomial distribution or the evaluation-probability distribution being modeled in particular as a normal distribution.

9. The method as claimed in claim 6, wherein the state-action probability distribution and the evaluation probability distribution are modeled as relative frequencies from the training data, the state-action probability distribution being modeled in particular as a multinomial distribution and the evaluation-probability distribution being modeled in particular as a normal distribution.

10. The method as claimed in claim 5, wherein the state-action probability distribution is modeled based upon a Bayesian estimate with an a-priori distribution and a-posteriori parameters, the a-posteriori parameters depending on the training data, wherein the a-priori distribution is a Dirichlet distribution or a normal distribution.

11. The method as claimed in claim 6, wherein the state-action probability distribution is modeled based upon a Bayesian estimate with an a-priori distribution and a-posteriori parameters, the a-posteriori parameters depending on the training data, wherein the a-priori distribution is a Dirichlet distribution or a normal distribution.

12. The method as claimed in claim 10, wherein parameters of the Dirichlet distribution correspond to a quotient from an average number of subsequent states and a total number of states according to the training data.

13. The method as claimed in claim 11, wherein parameters of the Dirichlet distribution correspond to a quotient from an average number of subsequent states and a total number of states according to the training data.

14. The method as claimed in claim 1, wherein the action-selecting rule to be learned is a deterministic action-selecting rule.

15. The method as claimed in claim 4, wherein the action-selecting rule to be learned is a deterministic action-selecting rule, and wherein the action-selecting rule in the m-th iteration step of Bellman iteration is as follows:

$$\pi^m(s) = \operatorname*{argmax}_{a} Q^m(s, a) - \xi \sigma Q^m(s, a),$$

wherein $\pi^m(s)$ is the selected action.

16. The method as claimed in claim 1, wherein the action-selecting rule to be learned is a stochastic action-selecting rule which indicates a probability distribution for the executable actions for a state of the technical system.

17. The method as claimed in claim 3,
wherein the action-selecting rule to be learned is a stochastic action-selecting rule which indicates a probability distribution for the executable actions for a state of the technical system, and
wherein in each iteration step of the Bellman iteration, as a new probability distribution for the executable actions, a probability distribution is determined which modifies the probability distribution of the last iteration step such that a higher probability is allocated to the action, which maximizes the value of the modified quality function.

18. The method as claimed in claim 1, wherein the technical system comprises a gas turbine.

19. The method as claimed in claim 1, wherein the technical system comprises a wind power plant.

20. A method of operating a technical system, wherein the technical system is operated based upon a control and/or feedback control learned using a method of computer-assisted learning of control and/or feedback control, wherein an operation of the technical system is based upon
states, the technical system adopting the states during the operation, and
actions which are executed during the operation of the technical system and transform a state of the technical system into a subsequent state, the method comprising:
learning a quality function and an action-selecting ruled based upon training data comprising states, actions and subsequent states detected during the operation of the technical system;
modeling an optimal operation of the technical system by the quality function;
indicating an action that should preferably be carried out for a state of the technical system by the action-selecting rule during the operation of the technical system;
determining a measure of a statistical uncertainty of the quality function by an uncertainty propagation during the learning of the quality function and the action-selecting rule;
determining a modified quality function as a function of the measure of the statistical uncertainty and a safety parameter corresponding to a statistical minimum requirement of the quality function, the uncertainty propagation using a covariance matrix in which non-diagonal elements are ignored; and
learning the action-selecting rule based upon the modified quality function,
wherein the action to be executed in a state of the technical system is selected using the learned action-selecting rule, and
wherein during the operation of the technical system, the method is repeated, the states newly adopted by the technical system and actions carried out being taken into account as training data during each repetition.

* * * * *